3,810,750
PLANT GROWTH REGULATING COMPOSITION AND PROCESS
Alan John Davidson, Wokingham, and Edwin Francis George, Eversley, near Basingstoke, England, assignors to Imperial Chemical Industries Limited, London, England
No Drawing. Filed May 1, 1970, Ser. No. 33,939
Claims priority, application Great Britain, May 16, 1969, 25,114/69
Int. Cl. A01n
U.S. Cl. 71—78         5 Claims

ABSTRACT OF THE DISCLOSURE

This invention relates to a method of regulating the growth of plants, and to compositions useful therefor.

According to the present invention there is provided a method of regulating the growth of plants, which comprises applying to the plants a fully or partially esterified dibasic carboxylic acid having at least two carbon atoms, in which at least one of the esterifying groups is an allyl, 2-chloroallyl, or propargyl group. The term "regulating" includes killing or severely damaging plants.

Preferably, at least one of the esterifying groups is an allyl or propargyl group. The dibasic carboxylic acid is preferably an aliphatic carboxylic acid. Preferred compounds for use in the method of the invention are those of the formula:

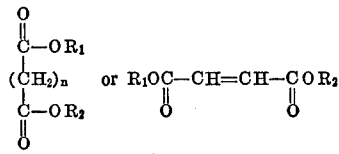

wherein $n$ can be 0 or an integer from 1 to 8 inclusive and wherein at least one of the groups $R_1$ and $R_2$ is an allyl or propargyl group, the remaining group being an allyl, propargyl, or other hydrocarbon group.

In another aspect, the invention provides a plant growth regulating composition, comprising as an active ingredient a fully or partially esterified dibasic carboxylic acid having at least two carbon atoms, in which at least one of the esterifying groups is an allyl, 2-chloroallyl, or propargyl group, and which is other than dipropargyl succinate, and a solid diluent, or a liquid diluent containing a surface active agent. Preferably at least one of the esterifying groups is an allyl or propargyl group. The dibasic carboxylic acid is preferably an aliphatic carboxylic acid.

More preferably, the active ingredient is a compound of the formula:

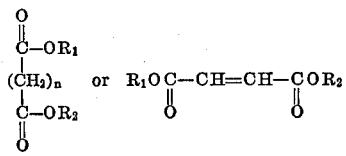

wherein $n$ can be 0 or an integer from 1 to 8 inclusive, and wherein at least one of the groups $R_1$ and $R_2$ is an allyl or propargyl group, the remaining group being an allyl, propargyl, or other hydrocarbon group.

Compounds preferred as active ingredients in compositions according to the invention include the following:

Diallyl succinate
Diallyl adipate
Allyl hexyl succinate
Diallyl fumarate
Diallyl malate
Diallyl maleate
Diallyl oxalate
Allyl methyl succinate
Monoallyl succinate
Allyl propargyl succinate Compositions according to the invention are useful in killing or damaging the growing point of shoots of the plant to which they are applied, without substantially damaging the rest of the plant. They may be broadly described as chemical pruning agents and are useful, for example, where it is desired to stop apical growth and to encourage the production of side shoots. The compositions can be used, for example, to stop the apical growth of young chrysanthemum plants and to bring about the development of a stocky, bushy habit of growth. Other uses include the control of growth of hedgerows and of shrubs, and of trees growing near power lines. The compositions can be used to restrict new growth of fruit trees, such as apple, pear and apricot trees. Further uses include the stopping of apical growth in tea and cocoa plants, thereby stimulating lateral growth. Lateral development may similarly be encouraged in woody ornamental plants, for example, Christmas trees and azalea plants. The compositions may be used to "top" cotton with the object of preventing lodging and/or increasing fruit retention.

When the shoots being treated are mature the killing of the growing point is less likely to be followed by the development of side shoots from axillary buds. In favorable circumstances, therefore, it may be possible to restrict the shoot growth of certain field crops at a level consistent with maximum crop yield. Thus the compositions could be used for the control of "bolting" in sugar beet, and increasing the sugar content of the beet by restricting growth of the foliage.

The compositions of the invention are most effective on plants in which the growing point is exposed and easily accessible. The compositions are, in general less effective on plants having a concealed growing point, for example large Brussels sprouts plants and most monocotyledonous plants.

In some plants, for example, tobacco, the compositions are useful in killing axillary buds from which undesired new shoots ("suckers") normally develop, as well as killing the apex of the plants.

Some of the compositions of the invention are able to induce abscission of petioles from the stem of the plant to which they are applied. Compositions having this type of activity can be used for example in defoliating cotton, or in loosening fruit (e.g. citrus fruit) on its stalk so that it can be more easily mechanically harvested.

The plant growth regulating activity of the compositions of the invention may be enhanced or modified by inclusion of further active ingredients in the compositions. Such ingredients may include other plant growth regulating substances. They may also include compounds which are normally considered to be herbicides, but which enhance the plant growth regulating activity of the composition when present in small amounts. If a herbicide is used as a further active ingredient of the composition it must be used at a rate low enough to avoid substantially damaging the plants to which the composition is applied. In general, soil-acting herbicides are less damaging than contact herbicides. In favorable circumstances up to 5,000 p.p.m. of a soil-acting herbicide may be included in the composition as prepared for spraying whereas in many cases the amount of a contact herbicide included in the composition may be 100 p.p.m. or less.

Suitable herbicides for inclusion in the plant growth regulating compositions of the invention include, for example, isopropyl N-phenyl carbamate (IPC), isopropyl N(3-chlorophenyl) carbamate (CIPC), carbyne, diuron, metoxuron, linuron, 6 (tertiary butylamino)-4-ethylamino-2-methylthio-1,3,5-triazine and 5-bromo-2-butyramido thiazole. Suitable growth regulating agents include the gibberellins and kinetin. Compositions containing gibberellic acid can encourage lateral development by killing apical buds while stimulating development of axillary buds.

Other plant growth regulating agents which may be included in the compositions of the invention comprise compounds which are active as inhibitors of bud growth. Examples of such compounds are disclosed in our copending U.K. patent applications Nos. 9,840/70 and 9,841/70.

The first of these applications discloses compounds of the formula:

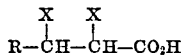

wherein R is an aryl group and X is a halogen atom, and salts, esters amides and nitriles thereof. The second application discloses compounds of the formula:

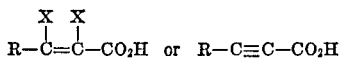

wherein R is an aryl group and wherein one of the two groups X and Y is a hydrogen atom, the remaining group being a halogen atom or a nitro group; and salts, esters, amides and nitriles thereof. Particular examples of the compounds useful as bud inhibitors include α,4-dichlorocinnamic acid, α,β-dibromodihydrocinnamic acid, meta chloro-α,β-dibromodihydrocinnamic acid, para chloro-α,β-dibromodihydrocinnamic acid, and 2,4-dichloro-α,β-dibromodihydrocinnamic acid.

Other compounds useful as bud inhibitors include the group of compounds collectively known as morphactins. Suitable morphactins include 9-hydroxy-9-carboxyfluorene and its methyl ester; 9-carboxyfluorene and its methyl ester; and 2-chloro-9-hydroxy-9-methoxycarbonyl fluorene (chlorfluorenol).

Compositions containing compounds which inhibit bud growth are useful for example in restricting the growth of hedges.

The plant growth regulating compositions of the invention include not only compositions which are ready for application to plants, but also concentrates which require to be diluted before use. Preferably the compositions contain from 0.01% to 90% by weight of the esterified dibasic carboxylic acid used as active ingredient. Dilute compositions ready for spraying conveniently contain from 0.15% to 2.0% by weight of the esterified carboxylic acid, while concentrated compositions conveniently contain from 20% to 70% by weight of the active ingredient.

Solid compositions according to the invention comprise a mixture of an active ingredient with a finely divided solid diluent, which may be, for example, kaolin, bentonite, kieselguhr or talc. Such compositions may be in the form of a dispersible powder, in which the diluent comprises a solid surface-active agent which assists in the dispersion of the composition in liquids.

Liquid compositions according to the invention may comprise a solution or dispersion of an active ingredient in water containing a surface-active agent, or may comprise a solution or dispersion of an active ingredient in an organic diluent, which may optionally contain a surface-active agent.

Suitable surface-active agents for use in compositions according to the invention include, for example, condensation products of ethylene oxide with octylphenol, nonylphenol, sorbitan monolaurate, oleyl alcohol, cetyl alcohol, and propylene oxide polymer. Further suitable surface-active agents include alkali and alkaline-earth metal salts of sulphuric acid esters and sulphonic acids, such as sodium dinonyl and dioctyl sulphosuccinates and calcium dodecylbenzenesulphonate, and alkali and alkaline earth metal salts of lignosulphonic acid. Other suitable surface-active agents include N-oxides of tertiary amines, for example the N oxides of tertiary amines derived from primary alkylamines of 10 to 20 carbon atoms by condensation with ethylene oxide.

The amount of surface-active agent used in the compositions of the invention will vary, but an amount of from 0.05% to 0.1% by weight is often suitable. For some applications, such as when the composition is to be used for killing the apex of a plant, the activity of the composition may be improved by increasing the amount of surface-active agent up to 5% by weight of the composition, or even more.

A preferred composition according to the invention comprises a dispersion of the active ingredient in water containing a wetter composition of the kind disclosed in our co-pending U.K. application No. 672/67. A particularly preferred composition comprises a dispersion of the active ingredient in water containing a mixture of nonanol and the condensate of ethylene oxide with p-nonylphenol sold under the name of "Lissapol" NX ("Lissapol" is a registered trademark).

Other preferred compositions according to the invention contain thickening agents, for example the cellulose derivatives sold under the name "Cellofas" ("Cellofas" is a trademark), which increase the viscosity of the composition. These are included in spray compositions when it is preferred to localize the action of the spray and as far as possible to prevent the spray from running down the stem of the plant to which it is applied.

The rate of application of compounds used as the active ingredients of the compositions according to the invention depends upon a number of factors, for example the plant species to be treated and the particular active ingredient chosen, but in general, an amount of from 0.5 to 15 pounds per acre is preferred, while from 1 to 5 pounds per acre is particularly preferred.

Where the compound is being applied to kill selectively the growing point or axillary buds of plants, the upper limit of the rate of application may be governed by the appearance of phytotoxic symptoms at high dose rates.

At high rates of foliar application, the compounds may indeed be used as herbicides. The compounds are more damaging to plants when applied to the roots, and may be used as pre-emergence herbicides.

In another aspect the invention provides new chemical compounds having the formula:

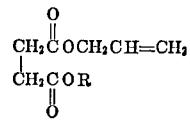

in which R represents an alkyl group having at least two carbon atoms or a propargyl group. Examples of such compounds include those having the following formulae:

$$C_2H_5OCOCH_2CH_2COOCH_2CH=CH_2$$
$$C_6H_{13}OCOCH_2CH_2COOCH_2CH=CH_2$$
$$C_{10}H_{21}OCOCH_2CH_2COOCH_2CH=CH_2$$
$$CH\equiv C-CH_2OCOCH_2CH_2COOCH_2CH=CH_2$$

In a further aspect, the invention provides a process of preparing chemical compounds of the formula:

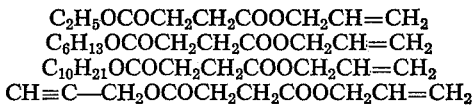

in which R represents an alkyl group a 2-chloroallyl group, or a propargyl group, which comprises reacting succinic anhydride with one molecular proportion of allyl alcohol, converting the resulting half-ester of succinic acid into an acid chloride of formula $$CH_2=CH-CH_2OCOCH_2CH_2COCl$$

by reaction with thionyl chloride or a chemical equivalent thereof, and reacting the acid chloride with an alkanol of formula ROH or with propargyl alcohol, or 2-chloroallyl alcohol.

The invention will now be illustrated by means of the following examples in which temperatures are expressed in degrees centigrade. The abbreviation p.p.m. is used for the words "parts per millions."

EXAMPLE 1

This example illustrates the inhibition of apical growth of Brussels sprouts plants brought about by treatment with compositions according to the invention.

Young Brussels sprouts plants were treated with a solution of allyl methyl succinate in 20 percent aqueous acetone at a rate equivalent to 5 lb./acre in 100 gallons/acre deionized water.

There were three treatments:

(1) The chemical was formulated together with 0.05 percent "Lissapol" NX.
(2) The chemical was formulated with a 0.05 percent solution of a mixture of nonanol and "Lissapol" NX in equal proportions by volume.
(3) Plants were sprayed with "Lissapol" NX 0.05 percent in 20 percent aqueous acetone to serve as a control.

The degree of inhibition of apical growth was scored on a scale of 0 (no effect)–10 (apex apparently completely dead) at two times after spraying. The results are as follows:

|  | Mean score when plants assessed after— | |
|---|---|---|
|  | 7 days | 10 days |
| Treatment: |  |  |
| 1 | 1.5 | 3.0 |
| 2 | 7.2 | 6.2 |
| 3 | 0 | 0 |

There was no chemical damage to any part of the plant except the apex. Loss of the growing point was followed by growth of previously dormant axillary buds.

These results demonstrate that allyl methyl succinate is able to inhibit the apical growth of Brussels sprouts. It can be seen that the best results were obtained with treatment No. 2, in which the wetting agent contained nonanol to assist the composition to spread.

EXAMPLE 2

This example illustrates the inhibition of apical growth in potato plants brought about by treatment with compositions according to the invention.

Potato tubers were planted in six-inch pots of John Innes potting compost No. 3. When shoots began to grow they were thinned to leave 2 or 3 large uniform stems in each pot. The plants in each of four pots were sprayed with emulsions of diallyl maleate at various concentrations in water. Each formulation was prepared by dissolving the appropriate weight of diallylmaleate in 4 ml. acetone. This acetone solution was poured into an aqueous solution of "Lissapol" NX and nonanol in the ratio of 6:4 prepared so that the final concentration of the "Lissapol" NX/nonanol mixture in the spray solution was 0.05 percent.

Potato plants treated with diallylmaleate formulations and other untreated plants were examined after 10 days. The degree of killing of the growing point of each shoot was assessed on a numerical scale of 0 (apex undamaged)–10 (apex completely dead). Results are as follows:

|  | Relative degree of apical destruction (mean score) |
|---|---|
| (1) Diallyl maleate 1.0 percent in 0.05 percent aqueous Lissapol NX/Nonanol 6:4 mixture | 8.9 |
| (2) Diallyl maleate 0.5 percent in 0.05 percent aqueous Lissapol NX/Nonanol 6:4 mixture | 8.1 |
| (3) Diallyl maleate 0.25 percent in 0.05 percent aqueous Lissapol NX/Nonanol 6:4 mixture | 10.0 |
| (4) Diallyl maleate 0.1 percent in 0.05 percent aqueous Lissapol NX/Nonanol 6:4 mixture | 0.1 |
| (5) Control, untreated plants | 0 |

There was no damage to the foliage of any of the treated plants except the death of the very young unexpanded leaves in the stem apices associated with the growing points of the shoots. On those plants where the apex was selectively destroyed by chemical treatment, the growth of lateral shoots was stimulated.

EXAMPLE 3

This example illustrates the inhibition of apical growth in chrysanthemum plants brought about by treatment with compositions according to the invention.

Five chrysanthemum cuttings were planted in each of several 5 inch flower pots. Two weeks later two pots were sprayed with a 0.5 percent solution of allylmethylsuccinate. The formulation was prepared by dissolving 100 mg. allylmethylsuccinate in 2 ml. acetone. 1 ml. of 1 percent Lissapol NX wetting agent was added to the acetone solution and the total volume made up to 20 ml. with deionized water.

A few days after spraying, the growing points on the cuttings which were sprayed with this preparation were seen to be shrivelled and dead. There was no damage to the remaining foliage which continued to be green and healthy. Plants in the remaining untreated pots were unaffected and terminal growth continued. Removal of the apices by treatment with the allylmethylsuccinate preparation caused axillary buds to be stimulated to grow. Their development was normal and bushy plants were formed each of which bore several flowers. By comparison, the plants in the untreated pots were tall and straggly and each bore only a single flower.

EXAMPLE 4

This example illustrates the inhibition of apical growth of pea plants brought about by treatment with compositions according to the invention.

"Meteor" pea plants, growing in John Innes compost in 4 inch pots (four plants per pot) were sprayed when about 6 mm. in height, with an aqueous formulation of allyl methyl succinate at the rate of 100 gallons to the acre.

The spray formulation was prepared by dissolving the appropriate amount of allyl methyl succinate in acetone (4 ml.) and making up to a volume of 19 ml. with deionized water. One ml. of a 1% solution of a wetting agent comprising a mixture of Lissapol NX and Nonanol in the ratio of 60:40 was then added.

Fourteen days after spraying, the number of side shoots in treated plants was compared with the number in untreated plants. The plants heights were also measured. The results are shown in the table below:

| Rate of application of chemical (pound/acre) | Average plant height (mm.) | Average side shoot development (scale 0-10) |
|---|---|---|
| 10 | 114 | 2.8 |
| 2.5 | 133 | 1.7 |
| 1 | 155 | 0 |
| 0 (control) | 175 | 0 |

In most plants apical growth was not completely inhibited, but the results in the above table show that treated plants are shorter than untreated plants, and that side shoot development is greater in treated plants.

EXAMPLE 5

This example illustrates the use of diallyl succinate and diallyl adipate in high concentration as herbicides.

An aqueous emulsion of 0.05 percent diallyl succinate was prepared by dissolving 100 mg. of the chemical in 5 ml. of acetone, 1 ml. of 1 percent "Lissapol" NX was added and the total volume was made up to 200 ml. with deionized water. The preparation was applied to the roots of tomato and Brussels sprouts plants grown in flower pots containing sand and potting compost. Ten days after treatment it was found that the bases of the stems and petioles of the experimental plants had collapsed causing the plants to die.

An aqueous emulsion of 0.5 percent diallyladipate was prepared by dissolving 100 mg. of the chemical in 5 ml. of acetone, 1 ml. of 1 percent "Lissapol" NX was added and the total volume was up to 200 ml. with deionized water. The preparation was sprayed onto young plants of tomato and Brussels sprouts grown in flower pots containing sand and spotting compost. Ten days after treatment it was found that the bases of the stems and petioles of the experimental plants had collapsed causing the plants to die.

EXAMPLE 6

This example illustrates the preparation of diesters of succinic acid having the formula:

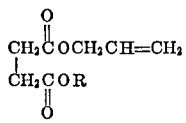

in which R represents an alkyl group having two or more carbon atoms.

Succinic anhydride (100 g., 1.0 M) and allyl alcohol (69.6 g., 1.2 M) were heated under reflux on a steambath for 1 hour 20 minutes. The excess of allyl alcohol was evaporated and the residue recrystallized at low temperature from petroleum (B.P. 80-100°) to give monoallyl succinate (79.0 g.) of melting point 0.5°.

The monoallyl succinate (79.0 g., 0.5 M) was warmed at 35° with thionyl chloride (119 g., 1.0 M) for 3 hours. The excess of thionyl chloride was evaporated and the residue distilled to give monoallyl succinoyl chloride (78.0 g.), of boiling point 51-53° at 0.15 mm.

To the monoallyl succinoyl chloride so obtained (1.0 M) an equimolar amount of an alkanol (ROH) was slowly added at 0°. The temperature was allowed to rise to room temperature over 2 hours. Hydrogen chloride was removed under reduced pressure and the residue was distilled to give the allyl alkyl succinate in about 60% yield. The compounds so prepared are tabulated below:

| R | Boiling point or M.P. | Refractive index ($n_D^{25}$) |
|---|---|---|
| $C_2H_5$ | 49-51°/0.1 mm. | 1.4325 |
| $C_6H_{13}$ | 114-116°/0.3 mm. | 1.4400 |
| $C_{10}H_{21}$ | 135-137°/0.2 mm. | 1.4450 |
| $C_{16}H_{33}$ | M.P. 65° | |
| $CH_2=CCl-CH_2$ | 80°/0.5 mm. | 1.4628 |

EXAMPLE 7

This example illustrates an emulsifiable concentrate according to the invention, which comprises the following ingredients:

| Component: | Percent by weight |
|---|---|
| Diallyl maleate | 50 |
| "Lubrol" L ("Lubrol" is a trademark) | 5 |
| Emulsifier SE | 5 |
| "Aromasol" H ("Aromasol" is a trademark) | To 100 |

This composition is suitable for mixing with water to provide a dilute composition for spraying. Preferably the diluted solution is mixed with 0.05 to 1 percent by volume of a further wetting agent comprising a mixture of "Lissapol" NX ("Lissapol" is a trademark) and nonanol in the proportion 60:40 by volume.

EXAMPLE 8

This example illustrates the preparation of allyl propargyl succinate, having the formula:

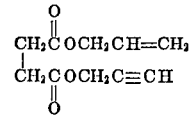

The procedure of Example 6 was followed with the exception that in place of the alkanol ROH, propargyl alcohol was used. The allyl propargyl succinate so obtained had a boiling point of 75-78°/0.15 mm. and a refractive index ($n_D^{24}$) of 1.4576.

EXAMPLE 9

This example illustrates *inter alia*, the acceleration of abscission of debladed petioles of Coleus plants brought about by application of compounds used as active ingredients of the compositions of the invention.

Coleus plants were grown in 3 inch pots of compost until approximately 6 inches high. Some of the leaf blades were then removed leaving petiole stumps (approximately ½ inch to ¾ inch in length) attached to the main stem.

The plants were then sprayed with aqueous solutions or emulsions of the compounds listed in the table below, the solutions containing 0.05% of Lissapol NX. The rate of application was 5 pounds per acre. About six days after treatment the number of debladed petioles which had fallen off the stems of treated and untreated plants was counted. The results are given in the table below. The figures are the average for groups of several plants.

| Treatment compound | Average number of petioles abscissed in— | |
|---|---|---|
| | Treated plants | Control plants (untreated) |
| Monoallyl succinate | 2.25 | 0.75 |
| Diallyl succinate | 4.75 | 1.75 |
| Allyl methyl succinate | 1.67 | 0.75 |
| Allyl ethyl succinate | | |
| Allyl hexyl succinate | 7 | 5 |
| Allyl decyl succinate | 5 | 0 |
| Diallyl malate | 8 | 2 |

Dially maleate and diallyl succinate were found to cause abscission of the lower leaves of tobacco plants when sprayed at a concentration of 0.8% w./v. in a solution containing 0.75% w./v. of Lissapol NX. When mature holly plants were sprayed with an aqueous composition containing 2% of diallyl succinate, considerable defoliation took place after a lapse of three to four days.

In each of the above experiments the defoliation or the detachment of the debladed petiole took place as a result of the formation of a true abscission zone and was not due to mere rotting of the base of the petiole.

EXAMPLE 10

This example illustrates the influence of wetter concentration on the degree of apical kill brought about by spray application of an aqueous composition containing diallyl succinate to chrysanthemum plants. The apical kill was assessed on a scale of 0 to 10 where 0 represents no damage and 10 complete kill. The wetting agents used was a surfactant sold under the name of "Lissapol" NX ("Lissapol" is a registered trademark) and comprising a condensate of p-nonyl phenol with from seven to eight molar proportions of ethylene oxide. The figures in the table below are the average of the results from the treatment of five plants.

| Percentage concentration of Lissapol NX (v./v.) | Percentage concentration of diallyl succinate (w./v.) | | | |
|---|---|---|---|---|
| | 0.3 | 0.25 | 0.2 | 0.15 |
| 5 | 10.0 | 8.8 | 8.4 | 3.6 |
| 1 | 10.0 | 6.4 | 4.8 | 0.8 |
| 0.5 | 9.4 | 6.6 | 5.4 | 0.2 |
| 0.05 | 4.2 | 2.0 | 1.8 | 0 |

EXAMPLE 11

This example illustrates the killing of the apices of chrysanthemum plants (variety Princess Anne) by application of diallyl succinate mixed with chlorpropham.

The chemicals were dissolved in 4 ml. of acetone, made up to 19 ml. with deionized water and 1 ml. of 1% Lissapol NX was then added. The solution so obtained was sprayed on to chrysanthemum plants grown in pots. The plants were sprayed to run-off. The degree of apical kill was assessed on a scale of 0 to 10 where 10 represents complete apical kill. There were five replicate plants in each test.

The treatments were as follows:

| Treatment number | Concentration of— | |
|---|---|---|
| | Chlorpropham (p.p.m.) | Diallyl succinate (p.p.m.) |
| 1 | 2,000 | 2,000 |
| 2 | 1,500 | 1,500 |
| 3 | 1,000 | 1,000 |
| 4 | 1,000 | 2,000 |
| 5 | 750 | 1,500 |
| 6 | 500 | 1,000 |
| 7 | 0 | 2,000 |
| 8 | 0 | 1,500 |
| 9 | 0 | 1,000 |

The degree of apical kill was assessed twenty six days after the spraying of the plants, with the following results.

Treatment No.                                Apical kill
1                                     6.0
2                                     6.0
3                                     8.0
4                                     10.0
5                                     6.0
6                                     0
7                                     0
8                                     0
9                                     0

Chlorpropham is inactive when sprayed alone on to chrysanthemum plants; it can be seen from the above results, however, that the mixtures with diallyl succinate have a much greater effect than diallyl succinate alone.

EXAMPLE 12

Following the procedure of Example 11, the effect of mixing other herbicides with diallyl succinate was examined. The degree of apical kill was assessed 9 days after spraying.

| Herbicide | Concentration (p.p.m.) | Degree of apical kill |
|---|---|---|
| Carbyne | 50 | 7.4 |
| Prebane [1] | 100 | 9.6 |
| Do | 50 | 9.2 |
| Linuron | 100 | 10.0 |
| Do | 50 | 9.6 |
| 5-bromo-2-butyramido thiazole | 50 | 7.2 |
| Control (diallyl succinate only) | | 6.6 |

[1] The chemical name for Prebane is 6-(tertiarybutylamino)-4-ethylamino-2-methylthio-1,3,5-triazine.

In each test, the concentration of diallyl succinate in the spray composition was 2000 p.p.m. In each case, an improved apical kill was obtained, as compared with the kill obtained with diallyl succinate alone.

EXAMPLE 13

This example illustrates the control of suckers in tobacco plants by spray applications of mixtures of diallyl maleate with chlorpropham and carbyne. The plants were grown outdoors and were in flower. The concentration of diallyl maleate in the spray was 0.2% in each test.

Treatment:                    Percentage sucker control
    Diallyl maleate alone (control)               60
    Diallyl maleate plus carbyne 0.1%           80
    Diallyl maleate plus carbyne 0.2%           100
    Diallyl maleate plus chlorpropham 0.1%      80
    Diallyl maleate plus chlorpropham 0.2%        90

EXAMPLE 14

This example illustrates the killing of the apical buds of chrysanthemum plants by spray application of mixtures of diallyl maleate and gibberellic acid. Apical kill was assessed on a scale of 0 to 10, where 10 represents complete kill.

| Diallyl maleate (p.p.m.) | Gibberellic acid (p.p.m.) | Apical kill |
|---|---|---|
| 2,000 | 5 | 10 |
| 2,000 | 25 | 10 |
| 2,000 | 100 | 10 |
| 2,000 | 250 | 10 |
| 2,000 | [1] 0 | 0 |

[1] Control.

Assessments were made 5 days after spraying.

EXAMPLE 15

This example illustrates the killing of the apical buds of chrysanthemum plants by spray application of mixtures of diallyl maleate and kinetin. There were ten replicates of each plant. Apical kill was assessed 5 days after spraying, on a scale of 0 to 10 as in Example 14.

| Diallyl maleate (p.p.m.) | Kinetin (p.p.m.) | Apical kill |
|---|---|---|
| 2,000 | 50 | 10 |
| 2,000 | 100 | 10 |
| 2,000 | 200 | 10 |
| 1,500 | 50 | 10 |
| 1,500 | 100 | 10 |
| 1,500 | 200 | 10 |
| 2,000 | 0 | 0 |
| 1,500 | 0 | 0 |

EXAMPLE 16

This example illustrates the killing of apical buds in chrysanthemum plants by various esterified dibasic carboxylic acids applied as a spray. The concentration of the esterified acids in the spray was 10,000 p.p.m., and the spray contained 2% of Lissapol NX as a surface-active agent. There were 5 replicates of each plant. Apical kill was assessed as in Example 15.

Compound: Apical kill

Allyl methyl succinate _____ 9.6
Monoallyl maleate _____ 2.2
Diallyl tartrate _____ 0.4
Diallyl terephthalate _____ 5.2
Diallyl isophthalates _____ 1.6

EXAMPLE 17

This example illustrates the killing of apical buds in Brussels sprouts, chrysanthemum and potato plants by spray applications of various esterified dibasic carboxylic acids. The compounds were present in the spray at a concentration of 0.5 percent and the spray contained 0.05% of Lissapol NX. The degree of apical kill was assessed for the chrysanthemum and potato plants on a scale of 0 to 10, where 10 represents complete kill. The results for the Brussels sprouts plants are given in the table below in the form of plus or minus signs. A plus sign indicates that the compound caused apical kill, while a minus sign indicates that it was inactive. The following table gives the results for a series of succinic esters of the formula:

$$\begin{array}{c} CH_2COOR' \\ | \\ CH_2COOR'' \end{array}$$

| Compound | | Test plant | | |
|---|---|---|---|---|
| R' | R'' | Brussels sprouts | Chrysanthemum | Potato |
| —CH$_2$CH=CH$_2$ | —CH$_2$CH=CH$_2$ | + | 10 | 10 |
| —CH$_2$CH=CH$_2$ | H | — | 0 | 5 |
| —CH$_2$CH=CH$_2$ | CH$_3$ | + | 0 | 0 |
| —CH$_2$CH=CH$_2$ | C$_2$H$_5$ | + | 5 | 7.5 |
| —CH$_2$CH=CH$_2$ | C$_6$H$_{13}$ | — | 0 | 6.5 |
| —CH$_2$CH=CH$_2$ | C$_{10}$H$_{21}$ | + | 0 | 0 |
| —CH$_2$CH=CH$_2$ | C$_{16}$H$_{33}$ | — | 1.5 | 0 |

The following table gives the results of tests carried out with esters of the formula:

$$\begin{array}{c} COOCH_2CH=CH_2 \\ | \\ (CH_2)_n \\ | \\ COOCH_2CH=CH_2 \end{array}$$

| Compound (value of n) | Test plant | | |
|---|---|---|---|
| | Brussels sprouts | Chrysanthemum | Potato |
| 0 | + | 10 | 10 |
| 1 | — | 5 | 9 |
| 3 | + | 5 | 5.5 |
| 4 | (¹) | 7.5 | 7 |
| 5 | + | 10 | 10 |
| 6 | + | 10 | 10 |
| 7 | + | 10 | 7.5 |
| 8 | + | 0 | 0 |

¹ Plant dead.

The following table gives the results of tests carried out with further allyl esters.

| Compound | Test plant | | |
|---|---|---|---|
| | Brussels sprouts | Chrysanthemum | Potato |
| Diallyl maleate | + | 7 | 9 |
| Diallyl fumarate | + | 2.5 | 7 |
| Diallyl malate | + | 8.25 | |
| Diallyl diglycollate | + | 3.5 | |
| Allyl propargyl succinate | — | 0 | 10 |
| Allyl 2-chloroallyl succinate | — | ¹ 4.5 | |

¹ Applied with 10,000 p.p.m. surface-active agent.

EXAMPLE 18

This example illustrates the killing of apical buds and inhibition of growth of lateral buds in chrystanthemum plants by spray application of diallyl succinate mixed with α,4-dichlorocinnamic acid. The spray contained 2,000 p.p.m. of diallyl succinate and 1% of Lissapol NX. Complete apical kill was obtained on all plants. The percentage degree of lateral bud inhibition at various spray concentrations of the α,4-dichlorocinnamic acid was as follows:

| Concentration of α,4-dichlorocinnamic acid (p.p.m.): | Percentage bud inhibition |
|---|---|
| 5,000 | 100 |
| 3,000 | 97 |
| 1,000 | 70 |
| 100 | 18 |

Five replicate plants were used at each rate of application. Assessments were made 5 days after spraying.

EXAMPLE 19

This example illustrates the killing of apical buds in chrysanthemum plants by application of diallyl succinate as a spray containing various surface-active agents. Assessment of apical kill was made 2 days after spraying, on a scale of 0 to 10 where 10 represents complete kill.

| Surface-active agent | Rate of application (p.p.m.) | Rate of application of diallyl succinate (p.p.m.) | Degree of apical kill |
|---|---|---|---|
| $\begin{array}{c} CH_3 \\ | \\ C_{14}H_{29}N \to O \cdot HCl \\ | \\ CH_3 \end{array}$ | 1,000 | 1,500 | 9.8 |
| | 1,500 | 1,500 | 10.0 |
| | 2,000 | 1,500 | 10.0 |

| Surface-active agent | Rate of application (p.p.m.) | Rate of application of diallyl succinate (p.p.m.) | Degree of apical kill |
|---|---|---|---|
| $\begin{array}{c} CH_3 \\ | \\ C_{10}H_{21}N \to O \cdot HCl \\ | \\ CH_3 \end{array}$ | 1,000 | 1,500 | 9.2 |
| | 1,500 | 1,500 | 10.0 |
| | 2,000 | 1,500 | 10.0 |
| $C_{10}H_{21}N \begin{array}{c} (CH_2CH_2O)_xH \\ \\ (CH_2CH_2O)_yH \end{array}$ (*) | 1,000 | 1,500 | 10.0 |
| | 1,500 | 1,500 | 9.8 |
| | 2,000 | 1,500 | 10.0 |
| None (control) | 0 | 2,500 | 5.2 |

*$x+y=4$.

We claim:

1. A method of inhibiting the apical and sucker growth of tobacco plants, which comprises spraying the plants overall with an effective amount of a compound selected from the group consisting of (A) fully esterified dibasic carboxylic acids having at least two carbon atoms, in which at least one of the esterifying groups is selected from the group consisting of allyl, 2-chloroallyl and propargyl, the remaining group being selected from 2-chloroallyl and hydrocarbyl, and (B) mono-esterified dibasic carboxylic acids having at least two carbon atoms, in which the esterifying group is selected from allyl, 2-chloroallyl, and propargyl, said compound inhibiting said apical and sucker growth without damaging the rest of the plant to which said compound is applied.

2. A method according to claim 1, wherein the compound applied to the plants is selected from the group consisting of compounds of the formula:

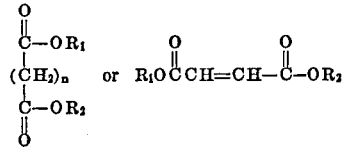

wherein $n$ is 0 or an integer from 1 to 8 inclusive, and wherein at least one of the groups $R_1$ and $R_2$ is an allyl or propargyl group, the remaining group being a hydrocarbyl group.

3. A method according to claim 1, wherein the compound applied to the plants is mixed with water and a wetting agent.

4. A method according to claim 1, wherein the compound applied to the plants is selected from the group consisting of diallyl succinate, diallyl adipate, diallyl glutarate, diallyl maleate, and mixtures thereof.

5. A method according to claim 1, wherein said compound is diallyl succinate.

References Cited
UNITED STATES PATENTS
2,603,560  7/1952  Stewart _____ 71—106 X JAMES O. THOMAS, JR., Primary Examiner U.S. Cl. X.R.
71—70, 76, 89, 90, 93, 106, 111, 115, 118